United States Patent [19]

Davis et al.

[11] 4,233,803
[45] Nov. 18, 1980

[54] ADJUSTABLE CONDITIONING PLATE FOR AN IMPELLER MOWER-CONDITIONER

[75] Inventors: Wilbur M. Davis; Bobby G. Sawyer, both of Ottumwa, Iowa; John A. Nichols, Brookston, Ind.; John F. Husman, Silvis, Ill.

[73] Assignee: Deere & Company, Moline, Ill.

[21] Appl. No.: 902,654

[22] Filed: May 4, 1978

[51] Int. Cl.³ .............................................. A01D 84/00
[52] U.S. Cl. .................................... 56/14.9; 56/16.4; 56/DIG. 1; 56/294
[58] Field of Search ...................... 56/1, DIG. 1, 12.7, 56/504, 505, 294, 16.4, 14.9

[56] References Cited

U.S. PATENT DOCUMENTS

| | | | |
|---|---|---|---|
| 2,941,347 | 6/1960 | Strom | 56/12.7 |
| 3,092,946 | 6/1963 | Mathews | 56/14.9 |
| 3,699,755 | 10/1972 | Hauser | 56/16.4 |
| 3,754,384 | 8/1973 | Case et al. | 56/14.4 |
| 4,055,037 | 10/1977 | Oosterling et al. | 56/16.4 |

FOREIGN PATENT DOCUMENTS

| | | | |
|---|---|---|---|
| 2147375 | 4/1972 | Fed. Rep. of Germany | 56/DIG. 1 |
| 2310079 | 10/1973 | Fed. Rep. of Germany | 56/DIG. 1 |
| 1266404 | 5/1961 | France | 56/12.7 |
| 936657 | 9/1963 | United Kingdom | 56/12.7 |
| 1010176 | 11/1975 | United Kingdom | 56/504 |

Primary Examiner—Robert A. Hafer

[57] ABSTRACT

A tractor drawn and powered impeller mower-conditioner includes a transverse disk type cutter bar. An impeller rotor with free swinging flails is mounted above and slightly to the rear of the cutter bar with its axis of rotation parallel to the cutter bar. A transversely extending concave conditioning plate conforms closely to the forward upper quadrant of the rotor. A hood covers the rotor and conditioning plate and includes a forward portion which serves in part as safety shielding and a rearwardly extending crop deflecting and windrow forming portion. The rotor is disposed and rotated so that the flails intercept cut material delivered rearwardly by the cutter bar and carry it inside the hood up and over the rotor through the confined space or conditioning zone between the rotor flails and the conditioning plate and discharge it rearwardly. In its passage through the conditioning zone, the crop material is bruised or conditioned in such a way that its rate of drying in the window is accelerated. The conditioning plate is mounted so that radial clearance between it and the rotor flails can be adjusted to vary the degree of conditioning. Circumferential adjustment of the plate in relation to the rotor is also possible and particularly useful in setting the height above the ground of the leading or lower edge of the conditioning plate to suit the height of the crop being cut and conditioned.

12 Claims, 3 Drawing Figures

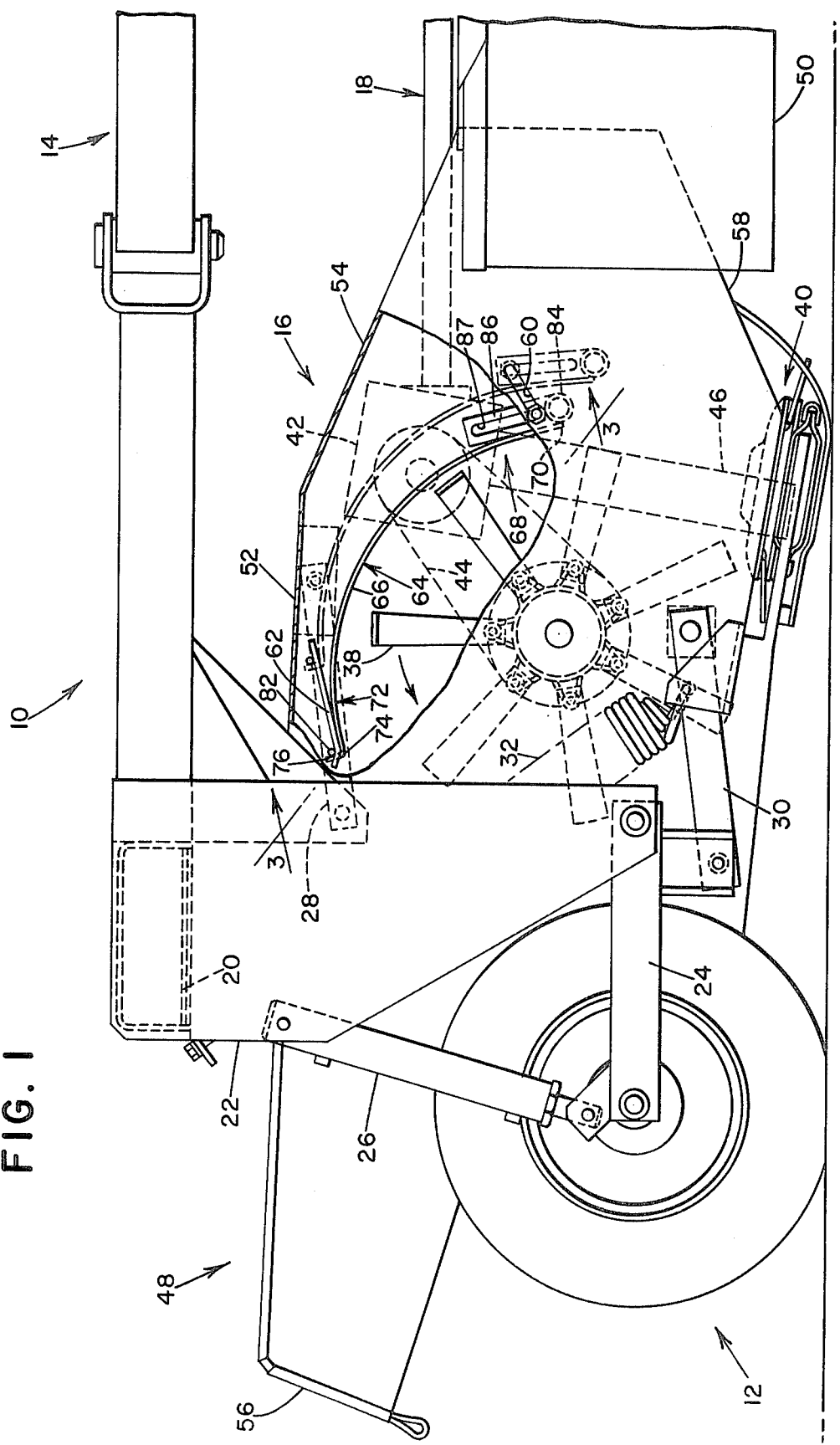

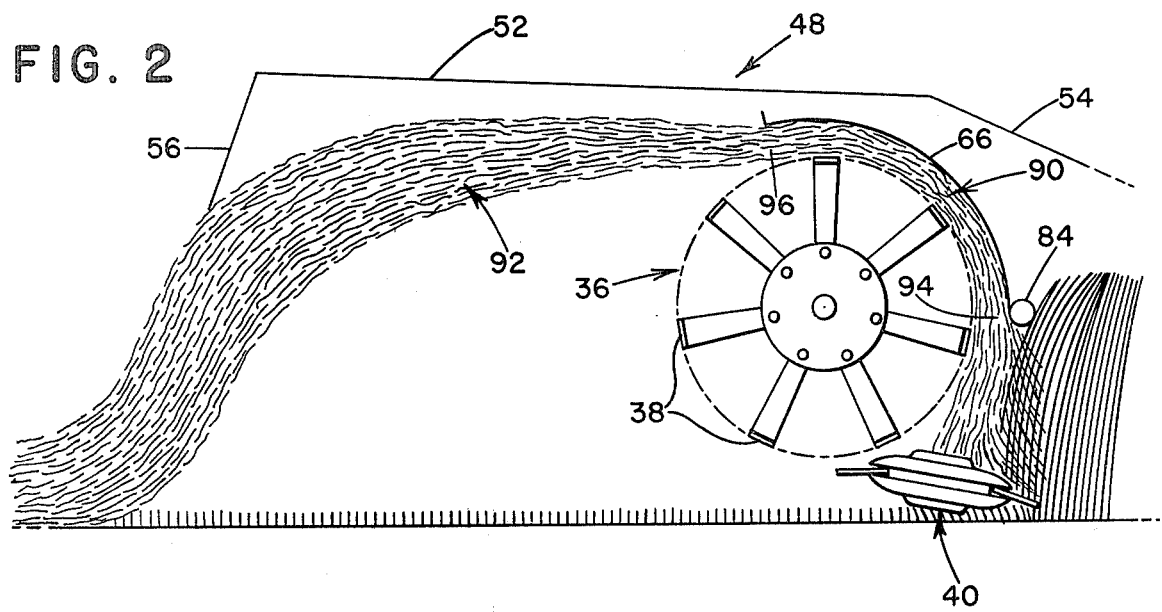
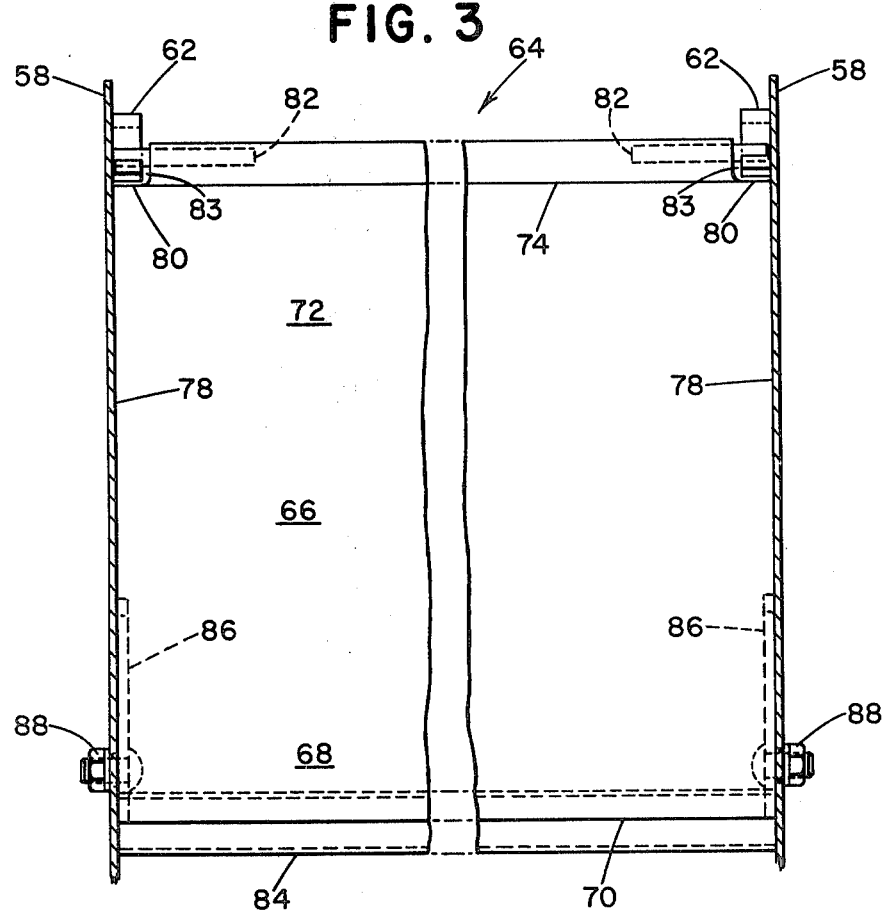

ADJUSTABLE CONDITIONING PLATE FOR AN IMPELLER MOWER-CONDITIONER

BACKGROUND OF THE INVENTION

This invention relates to a machine for cutting, conditioning and windrowing crop material such as grasses and legumes and more particularly to an improved conditioning means for such a machine in which a generally transverse cutter bar delivers cut material rearwardly to an adjacent impeller rotor parallel to the cutter bar for conditioning and discharge into a windrow.

Typically, such machines are provided with a hood over the rotor, the forward part conforming fairly closely to a forward and upper quadrant of the rotor periphery and creating a confined conveying channel or conditioning zone through which crop material is carried by the rotor before being discharged rearwardly into a crop deflecting and windrow forming portion of the hood. The configuration and disposition of the hood portion forming the conveying channel and conditioning zone have important effects on power consumption and material flow control as well as on the intensity of crop treatment or conditioning and, although operating and crop conditions vary widely, some machines offer no provision for adjustment in this area.

The known attempts to offer some adjustment suffer from some limitations and disadvantages. For example, U.S. Pat. No. 3,092,946, Matthews, discloses a machine in which both cutting and conditioning are done by a rotor and in which a forward portion of a hood is hinged directly to a rearward portion of the hood by a fixed hinge to provide adjustment of radial clearance at the crop entry to the conveying channel. Independent adjustment of crop entry height is achieved through a completely separate transverse push bar mounted independently ahead of and below the adjustable hood portion. German Pat. No. 2,147,375 assigned to Bucher-Guyer AG discloses an impeller mower-conditioner in which only the lower or leading edge of an otherwise fixed hood is adjustable providing a range of adjustment for height of entry into the conveying channel and for the width of the entry to the channel itself. In both cases the adjustment means provided principally affect the conveying channel entry and require two separate adjustment operations. Some of the combinations of height and radial clearance setting provided result in undesirable, potentially power consuming and flow deflecting discontinuities on the inner surfaces of the conveying channel adjacent its entry.

Another approach to providing control of conditioning intensity is disclosed in U.S. Pat. No. 3,699,755, Bucher-Guyer, where a comb-like impedance may be adjustably intruded into the conveying channel. But here again the attempt is to control the function of a control surface of substantial circumferential extent by a quite localized modification.

SUMMARY OF THE INVENTION

Accordingly, it is an object of the present invention to provide for an impeller mower-conditioner a hood portion including an internal surface cooperating with a rotor periphery to define a conveying channel and conditioning zone which is conveniently and generally adjustable. This object may be well realized in the form of an arcuate or concave conditioning and guide plate hood portion which is adjustably mounted independently of any other hood portion, such as, for example, a forward hood portion having a safety shielding function or a rearward hood portion having a crop deflecting and windrowing function. An independently mounted conditioning plate may, of course, be disposed so that crop material is delivered by the rotor from the conveying channel and conditioning zone directly into a cooperating rear hood portion.

It is a feature of the invention to provide a conditioning plate hood portion which is conveniently adjustable both radially and circumferentially with respect to a rotor and as a rigid unit without change in configuration. Adjustment convenience may be achieved by supporting the conditioning plate at only two spaced points along its arcuate extent, support at one point freely allowing both pivotal and circumferential motion of the conditioning plate relative to the rotor and the other including a releasable clamp or locking means providing for the conditioning plate, adjacent this point of support, a range of radial and circumferential adjustment such that height and radial adjustments may be made independently or together in any combination. An advantage of such support means is that desired height adjustment (or more generally circumferential adjustment) of the lower or leading edge of the conditioning plate may be made without significant change in the radial clearance between the plate and the rotor or of length of arcuate span of the conditioning plate. Such support means may appropriately be provided at the opposite ends of a concave conditioning plate associated with an elongated rotor.

It is an advantage of the invention that it permits both generally radial adjustment, to control intensity of conditioning and/or width of entry into the conveying channel and conditioning zone, as well as adjustment of its leading or lower edge to control height of entry to the conveying channel, to be made with no potentially power consuming or material flow impeding changes in configuration of the internal functioning surfaces of the conditioning plate.

It is a feature of the invention to provide for circumferential adjustment of the conditioning plate and hence of its trailing edge and, therefore, an opportunity of exercise some control of the direction of discharge of material from the conveying channel and thus of windrow conformation.

The portion of the support means freely providing relative pivoting and circumferential motion between the conditioning plate and the rotor is preferably provided towards the trailing edge of the conditioning plate and preferably disposed so that relative movement during adjustment is approximately circumferential. However, the alignment of the translatory movement permitted may be chosen so that adjustment may increase or decrease the radial clearance between the rotor and the adjacent portion of the conditioning plate so supported.

BRIEF DESCRIPTION OF THE DRAWINGS

FIG. 1 is a somewhat schematic right side elevation of an impeller mower-conditioner embodying the invention, with the header in operating position and omitting the forward portions of the tongue and header safety curtain. The hood is partially cut-away to expose the conditioning plate or concave.

FIG. 2 is a schematic side elevation to illustrate the flow of crop material through the machine.

FIG. 3 is an enlarged partial view taken approximately on line 3—3 of FIG. 1 showing the conditioning plate supported by the side sheets of the hood.

DESCRIPTION OF THE PREFERRED EMBODIMENT

The invention is embodied in an impeller mower-conditioner which includes a main frame indicated generally by the numeral 10, a pair of wheel assemblies 12 for supporting the machine above the ground, a forward extending tongue 14 for hitching to a towing vehicle such as an agricultural tractor, a header 16 carried by the main frame 10 and a drive line 18 for transmitting power from the towing vehicle to the header 16. A mower-conditioner of this type is described in detail in co-pending U.S. patent application Ser. No. 853,035 also assigned to the assignee of the prevent invention.

The main frame includes a transverse arch-like structure composed of a transverse beam 20 (the cross sectional outline of which is indicated only in hidden outline in FIG. 1) and opposite upright left- and right-hand depending portions or wheel drops 22 rigidly attached to the opposite ends of the beam 20. Each wheel assembly includes a wheel support arm 24 pivotally connected to the lower end of the wheel drop members 22 and a hydraulic cylinder 26 for swinging the wheel support arm 24 to control the height of the main frame 10 and hence of the header 16 between a transport position and operating position such as that indicated in FIG. 1.

The header 16 is floatingly supported between the wheel drops 22 by a suspension system including approximately parallel upper and lower links 28 and 30, respectively, and a float spring 32. The header 16 includes sub-frame members (not shown in the drawings) providing structural support for a transversely extending rotor 36 which includes a plurality of swingably mounted flails or conditioning elements 38, a transversely extending disk cutter bar 40 and a gear box 42. Drives for the rotor 36 and the cutter bar 40 are conventional, the gear box 42 receiving input from the drive line 18 and transmitting power through a V-belt drive 44 and a shaft and gear drive 46 to the rotor 36 and cutter bar 40 respectively.

The header sub-frame also supports a hood indicated generally by the numeral 48 which substantially encloses the rotor 36 and cutter bar 40 and carries at its forward end a safety curtain assembly 50. The hood 48 includes an approximately horizontal top sheet 52 from which extend a forwardly and downwardly inclined baffle sheet 54 and from the rear of the top sheet 52, a rearwardly and downwardly inclined baffle 56. The inverted box-like form of the hood 48 is completely by opposite vertically extending side sheets 58, which converge inwards towards the rear (not shown in the drawings) to assist in deflecting the treated crop into a windrow.

In each side sheet 58 there is an inclined elongated slot 60 ahead of the rotor 36 and approximately on the level of the rotor axis. Attached to and extending inwardly from the inner surface of each side sheet 58 adjacent the underside of the top sheet 52 and somewhat rearward of top dead center of the rotor is an elongated guide rail or track member 62, each guide rail is disposed approximately tangentially with respect to an arc swung from the rotor axis to touch the mid-point of the length of the guide rail.

A conditioning plate or concave assembly 64 extends between the opposite side sheets 58 as seen best in FIG. 3. It includes an elongated arcuate conditioning plate or concave 66 having a leading portion 68 including a leading edge 70 and a trailing portion 72 including a trailing edge 74 and an approximately radially extending bent up flange 76. Opposite sides 78 of the conditioning plate 66 lie closely adjacent the opposite hood side sheets 58. Opposite clearance notches 80 are provided in the trailing portion 72 of the conditioning plate by removing a portion of the flange 76 adjacent the trailing edge 74. An elongated guide rod 82 is rigidly attached at each end of the flange 76. The rods 82 are disposed radially somewhat above the trailing edge 74 so that an open ended transversely extending slot or track follower 83 is formed. The entire length of the leading edge 70 of the conditioning plate 66 is reinforced by a rigidly attached tubular push bar 84. The concave assembly 64 is completed by a pair of opposite mounting plates 86. The plates 86 are rigidly attached with their outer surfaces flush with the opposite sides 78 of the conditioning plate 66 and each includes an elongated slot 87 disposed approximately circumferentially with respect to the arcuate form of the conditioning plate 66. In assembly, the guide rails 62 are engaged in the guide slots 83 as indicated in FIG. 3 and a releasable clamping bolt 88 passes through each side sheet slot 60 and mounting plate slot 87 to rigidly but adjustably secure the conditioning plate assembly 64 adjacent its leading portion 68. The guide rail 62 is a loose fit in the slot 83, permitting free sliding movement and sufficient pivoting of the conditioning plate trailing portion 72 to accommodate the range of adjustment provided by the slots 60 and 87.

In operation the impeller mower-conditioner is advanced in a field of standing crop powered by a towing vehicle such as an agricultural tractor so that the cutter bar 40 severs the crop material, the severed material tending to move rearwardly over the cutter bar. As indicated in FIG. 2, the crop material moving relatively rearwardly is intercepted by the flails 38 of the rotor 36 and carried at first generally upwards and then up and over the rotor 36 through a conditioning zone 90 defined by the juxtaposition of the conditioning plate 66 and the rotor 36 to be discharged in a generally rearwardly and horizontally directed stream of material 92 within the hood 48.

The flails 38 accelerate the crop material within the conveying channel or conditioning zone 90, but typically the crop material does not reach the peripheral velocity of the rotor so that there is "slippage" between the material and the flails and a given particle of material is repeatedly engaged by successive flails, which action is an important component of the total crop conditioning effect of the machine. For given crop and operating conditions, the variables of performance and output for an impeller mower-conditioner include material control adjacent the entry 94 of the conditioning zone 90, the degree of material conditioning within the zone 90 and the direction and velocity of the stream of material 92 emerging from the conditioning zone exit 96. Significant control of these variables may be achieved by a conditioning plate or concave assembly such as that of the present invention which provides adjustability of leading edge or push bar height, of radial spacing between the concave and the rotor periphery and of circumferential location of its trailing edge. Considerable reorientation and change of direction of material must take place adjacent the conditioning zone entry 94 and suitable vertical adjustment of the push bar 84 helps insure that this is done smoothly and efficiently. Radial spacing between the concave 66 and the periphery of the flails 38 effects both the intensity of conditioning of the crop material and its velocity through the conditioning zone 90, a smaller clearance in general increasing the intensity and velocity. Radial clearance adjacent the zone entry 94 also has an effect on the efficiency of entry of material into the conditioning zone 90. As can be seen from FIG. 1, circumferential adjustment of the conditioning plate 66 effects the tangent angle of the plate adjacent the zone exit 96 so that a "rearward" adjustment of the conditioning plate assembly 64 would tend to direct the emerging stream of crop material 92 more directly downward and less in contact with the hood 48 resulting in a more compact windrow.

FIG. 1 shows two extreme positions of adjustment of the conditioning plate assembly 66. A maximum push bar height and minimum radial clearance at the conditioning zone entry 94 is indicated by the full line while the broken line illustrates an adjustment for a minimum push bar height and a maximum radial clearance at the conditioning zone entry. The radius of arc of the conditioning plate 66 is such that when adjusted for maximum radial clearance, it is approximately concentric with the rotor. At other adjustment positions, the conveying channel 90 is generally somewhat divergent in relation to the direction of conveying. It will be observed from FIG. 1 that these two extreme adjustment settings correspond to a wide range of circumferential displacement of the trailing edge 74 of the conditioning plate 66. Vertical (circumferential) adjustment of the push bar 84 and circumferential adjustment of the trailing edge 74 are, of course, quite directly interrelated but in certain operating conditions control of one of them may emerge as being more important and adjustment may be made accordingly.

Although only two adjustment positions are shown in FIG. 1, the versatility of the mounting and adjusting means will be appreciated and, keeping within the scope of the invention, the configuration may be adapted to meet particular design objectives by modifications in the alignment of the slots 60 and 87 in the side sheets 58 and mounting bracket 86 respectively, and of the alignment of the guide rail 62. Further the convenience of assembly and adjustment will also be appreciated, one releasable clamp-type fastener at each end of the conditioning plate assembly being sufficient both to secure the assembly and permit a full range of adjustment.

We claim:

1. In a mobile mower-conditioner for advancing over a field to cut and condition crop material and including a frame, an improved impeller-type crop handling and conditioning means comprising:
   an impeller rotor for engaging cut crop material rotatably mounted in the frame and having an axis of rotation approximately transverse the machine;
   a concave guide plate having an inner surface, partially wrapping and generally concentric with the rotor, extending over only approximately the forward upper quadrant of the rotor and spaced radially from the rotor periphery, the inner surface cooperating with that periphery to define a transversely and circumferentially extending conveying channel, said guide plate having with respect to rotor rotation leading and trailing edges and being disposed so that a tangent to the inner surface adjacent the trailing edge is approximately horizontal;
   mounting means for adjustably supporting the guide plate in the frame so that the disposition of both the leading and the trailing edges may be changed relative to the rotor periphery; and
   means for rotating the rotor so that at least a portion of the cut crop material engaged by the rotor is conveyed generally circumferentially in the conveying channel by the rotor and discharged from the channel adjacent the trailing edge in a substantially horizontal rearwardly directed stream.

2. The invention defined in claim 1 wherein the mounting means are operable to adjust the leading and trailing edges of the guide plate simultaneously and generally circumferentially relative to the periphery of the rotor.

3. The invention defined in claim 1 wherein the leading edge of the guide plate is disposed ahead of the rotor and approximately in the horizontal plane of the axis of the rotor and the mounting means are operable to adjust the leading edge vertically within said approximate disposition.

4. The invention defined in claim 1 wherein the guide plate further includes a wall portion connected rigidly between the leading and trailing edges so that the circumferential spacing between the leading and trailing edges is fixed.

5. An impeller mower-conditioner for advancing over a field to cut, condition and windrow crop material comprising:
   a frame having opposite sides;
   a transverse cutter bar carried by the frame for cutting the crop material, the material moving generally rearwardly over the cutter bar as the mower-conditioner advances;
   an impeller rotor transversely and rotatably mounted in the frame and disposed to intercept crop material moving over the cutter bar and including a plurality of conditioning elements spaced along and around the rotor;
   a hood carrier by the frame substantially spanning the transverse extent of the rotor and having a fore-and-aft and transversely extending top wall and including a forward portion disposed at least partially above the rotor and a rearward extending material direction control portion;
   a transversely extending conditioning concave partially wrapping and generally concentric with the rotor and having with respect to rotor rotation a leading portion including a leading edge disposed above the cutter bar and approximately parallel to the rotor axis and a trailing portion including a trailing edge, said trailing edge being above the rotor and spaced below the top wall of the hood and in a crop delivery relationship with the direction control portion of the hood, the concave extending over approximately the forward upper quadrant of the rotor;
   adjustable mounting means connected between the concave and the frame for adjustably supporting the concave so that both the leading and the trailing portions are adjustable in relation to the rotor periphery;
   drive means for the cutter bar; and
   drive means for rotating the impeller so that crop material intercepted by the impeller is carried over the top of the impeller between the impeller and the concave and discharged rearwardly into the material direction control portion of the hood.

6. The invention defined in claim 5 wherein the concave is disposed so that a fore-and-aft extending tangent to said concave adjacent its trailing edge is approximately parallel and adjacent to the top wall of the hood.

7. In a mobile mower-conditioner for advancing over a field to cut and condition a crop and including a frame, an improved impeller-type crop handling and conditioning means comprising:

an impeller rotor rotatably mounted in the frame and having an axis of rotation approximately transverse the machine;

a concave guide plate partially wrapping and generally concentric with the rotor, extending over approximately the forward upper quadrant of the rotor and spaced radially from the rotor periphery, the plate cooperating with that periphery to define a transversely and circumferentially extending conveying channel, said guide plate having with respect to rotor rotation leading and trailing edges; and mounting means for adjustably supporting the guide plate in the frame so that the disposition of both the leading and the trailing edges may be changed relative to the rotor periphery, said mounting means including an approximately circumferentially extending track element carried by the frame and the guide plate further including a track follower slidingly engageable and supportable by the track element and the mounting means being operable to adjust the guide plate generally circumferentially with respect to the rotor, the track element and the track follower cooperating to control the disposition of the trailing edge of the guide plate.

8. The invention defined in claim 7 wherein the track element has opposite first and second ends and the first end is radially closer to the rotor axis than the second end so that circumferential adjustment of the guide plate results in a change of the radial disposition of the trailing edge relative to the rotor periphery.

9. The invention defined in claim 7 wherein the mounting means are operable to adjust the guide plate circumferentially so that the trailing edge is disposed approximately vertically above the rotor axis.

10. An impeller mower-conditioner for advancing over a field to cut, condition and windrow crop material comprising:

a frame having opposite sides;

a transverse cutter bar carried by the frame for cutting the crop material, the material moving generally rearwardly over the cutter bar as the mower-conditioner advances;

an impeller rotor transversely and rotatably mounted in the frame and disposed to intercept crop material moving over the cutter bar and including a plurality of conditioning elements spaced along and around the rotor;

a hood carrier by the frame substantially spanning the transverse extent of the rotor and having a fore-and-aft and transversely extending top wall and including a forward portion disposed at least partially above the rotor and a rearward extending material direction control portion;

a transversely extending conditioning concave partially wrapping and generally concentric with the rotor and having with respect to rotor rotation a leading portion including a leading edge disposed above the cutter bar and approximately parallel to the rotor axis and a trailing portion including a trailing edge, said trailing edge being above the rotor and in a crop delivery relationship with the direction control portion of the hood, the concave extending over approximately the forward upper quadrant of the rotor;

adjustable mounting means connected between the concave and the frame for adjustably supporting the concave so that both the leading and the trailing portions are adjustable in relation to the rotor periphery, said mounting means including a pivoting connection between the frame and the concave adjacent the trailing portion, said pivotal connection being slidably supported by the frame, said slidable support constraining the pivoting connection to move generally circumferentially with respect to the rotor periphery and the leading portion of the concave being rigidly connected to the trailing portion of the concave so that circumferential adjustment of the leading edge results in approximately circumferential adjustment of the concave with respect to the rotor;

drive means for the cutter bar; and drive means for rotating the impeller so that crop material intercepted by the impeller is carried over the top of the impeller between the impeller and the concave and discharge rearwardly, into the material direction control portion of the hood.

11. An impeller mower-condition for advancing over a field to cut, condition and windrow crop material comprising:

a frame having opposite sides;

a transverse cutter bar carried by the frame for cutting the crop material, the material moving generally rearwardly over the cutter bar as the mower-conditioner advances;

an impeller rotor transversely and rotatably mounted in the frame and disposed to intercept crop material moving over the cutter bar and including a pluarlity of conditioning elements spaced along and around the rotor;

a hood carried by the frame substantially spanning the transverse extent of the rotor and having a fore-and-aft and transversely extending top wall and including a forward portion disposed at least partially above the rotor and a rearward extending material direction control portion;

a transversely extending conditioning concave partially wrapping and generally concentric with the rotor and having with respect to rotor rotation a leading portion including a leading edge disposed above the cutter bar and approximately parallel to the rotor axis and a trailing portion including a trailing edge, said trailing edge being above the rotor and in a crop delivery relationship with the direction control portion of the hood, the concave extending over approximately the forward upper quadrant of the rotor;

adjustable mounting means connected between the concave and the frame for adjustably supporting the concave so that both the leading and the trailing portions are adjustable in relation to the rotor periphery, said mounting means including releasable clamping means engaging the concave adjacent the leading portion and operable to provide a range of circumferentially and radially extending dispositions for said leading portion with respect to the rotor periphery;

drive means for the cutter bar; and drive means for rotating the impeller so that crop material intercepted by the impeller is carried over the top of the impeller between the impeller and the concave and discharged rearwardly into the material direction control portion of the hood.

12. The invention defined in claim 11 wherein the releasable clamping means includes intersecting slot means so that adjustment of the leading portion is continuously variable within said range.

* * * * *